(12) United States Patent
Suzuki (10) Patent No.: US 8,122,990 B2
(45) Date of Patent: Feb. 28, 2012

(54) RADIATOR MOUNTING STRUCTURE FOR MOTORCYCLE

(75) Inventor: Shota Suzuki, Wako (JP)

(73) Assignee: Honda Motor Co., Ltd., Tokyo (JP)

(\*) Notice: Subject to any disclaimer, the term of this patent is extended or adjusted under 35 U.S.C. 154(b) by 149 days.

(21) Appl. No.: 12/565,422

(22) Filed: Sep. 23, 2009

(65) Prior Publication Data
US 2010/0078242 A1 Apr. 1, 2010

(30) Foreign Application Priority Data

Sep. 30, 2008 (JP) ................................ 2008-255163

(51) Int. Cl.
*B60K 11/04* (2006.01)

(52) U.S. Cl. ...... 180/68.6; 180/68.4; 180/218; 180/219; 180/229

(58) Field of Classification Search .................. 180/68.4, 180/68.6, 218, 219, 229
See application file for complete search history.

(56) References Cited

U.S. PATENT DOCUMENTS

| | | | | |
|---|---|---|---|---|
| 4,622,965 A * | 11/1986 | Teeple | ..................... | 128/207.14 |
| 4,632,206 A * | 12/1986 | Morinaka et al. | ............. | 180/229 |
| 4,776,417 A * | 10/1988 | Takeuchi et al. | ............. | 180/68.4 |
| 4,799,569 A * | 1/1989 | Hattori et al. | ................. | 180/219 |
| 4,971,171 A * | 11/1990 | Yamada et al. | .............. | 180/68.1 |
| 4,979,584 A * | 12/1990 | Charles | ........................ | 180/68.1 |
| 5,176,111 A * | 1/1993 | Nakamura et al. | ......... | 123/41.01 |
| 5,715,778 A * | 2/1998 | Hasumi et al. | ............. | 123/41.51 |
| 6,155,335 A * | 12/2000 | Acre et al. | ....................... | 165/41 |
| 6,675,924 B2 * | 1/2004 | Takahashi et al. | ............ | 180/229 |
| 7,143,854 B2 * | 12/2006 | Arnold | .......................... | 180/229 |
| 7,556,115 B2 * | 7/2009 | Iwanaga | ......................... | 180/229 |
| 7,637,342 B2 * | 12/2009 | Iwanaga et al. | ............... | 180/229 |
| 7,740,095 B2 * | 6/2010 | Matsushima | ................. | 180/227 |
| 2001/0004011 A1 * | 6/2001 | Hasumi | .......................... | 165/125 |
| 2004/0124028 A1 * | 7/2004 | Lachapelle et al. | ........... | 180/291 |
| 2005/0029032 A1 * | 2/2005 | Kudo et al. | ................... | 180/219 |
| 2007/0107967 A1 * | 5/2007 | Satake | .......................... | 180/218 |
| 2008/0006329 A1 | 1/2008 | Yamakura et al. | | |
| 2008/0156561 A1 * | 7/2008 | Yano et al. | .................... | 180/219 |
| 2009/0095553 A1 * | 4/2009 | Iwanaga et al. | ............... | 180/229 |
| 2009/0255489 A1 * | 10/2009 | Fujiwara et al. | ........... | 123/41.57 |

FOREIGN PATENT DOCUMENTS

| | | |
|---|---|---|
| DE | 75 27 145 U | 11/1977 |
| EP | 1 564 388 A2 | 8/2005 |
| JP | 59-105918 A | 6/1984 |
| JP | 2004-301026 A | 10/2004 |
| JP | 254463 | * 10/2008 |

\* cited by examiner

*Primary Examiner* — J. Allen Shriver, II
*Assistant Examiner* — James Triggs
(74) *Attorney, Agent, or Firm* — Westerman, Hattori, Daniels & Adrian, LLP (57) ABSTRACT

A radiator mounting structure for motorcycle, in which a radiator is disposed forward of a water-cooled engine mounted on a body frame and an upper portion of the radiator is attached to the body frame, in which running-air that passes the radiator is not directed to a rider. The radiator is reliably supported so as not to be affected by heat from the engine with an increase in the number of parts avoided. A shroud for covering the radiator from behind is attached the radiator and has at an upper portion thereof attachment arm portions attached to a body frame. Attachment portions fastened to stays provided on the body frame are provided at a rear lower portion of the shroud.

14 Claims, 7 Drawing Sheets

RADIATOR MOUNTING STRUCTURE FOR MOTORCYCLE

TECHNICAL FIELD

The present invention relates to a radiator mounting structure for motorcycle in which a radiator is disposed forward of a water-cooled engine mounted on a body frame and an upper portion of the radiator is attached to the body frame.

BACKGROUND OF THE INVENTION

There is known from Japanese Patent Laid-open No. 2004-301026 a motorcycle in which a radiator disposed forward of a water-cooled engine mounted on a body frame is mounted at an upper portion thereof to a vehicle body and at a lower portion thereof to a stay extending from the engine.

SUMMARY OF THE INVENTION

However, the structure disclosed in Japanese Patent Laid-open No. 2004-301026 mentioned above needs a stay for supporting the lower portion of the radiator, which increases the number of component parts. In addition, since the stay is provided on the engine, consideration of the cooling effect of the radiator is additionally needed depending on the displacement of the motorcycle. In addition, there is also a demand that running-air that passes the radiator is not directed to the rider during traveling of the motorcycle.

The present invention has been made in view of such situations and aims to provide a radiator mounting structure for motorcycle in which the running-air that has passed a radiator is not directed to the rider, the radiator is reliably supported so as not to be affected by heat from the engine, and an increase in the number of parts avoided.

A first aspect of the invention is characterized in that in a radiator mounting structure for motorcycle in which a radiator is disposed forward of an water-cooled engine mounted on a body frame and an upper portion of the radiator is attached to the body frame, a shroud for covering the radiator from behind is attached to the radiator having at an upper portion thereof an attachment arm portion attached to the body frame, and attachment portions fastened to respective stay provided on the body frame are provided at a rear lower portion of the shroud.

A second aspect of the invention is characterized in that in addition to the configuration of the first aspect of the invention, a radiator fan is attached to the shroud made of a synthetic resin, and a supporting leg portion is provided at a lower portion of the shroud so as to come into abutment against a rear portion of the radiator.

A third aspect of the invention is characterized in that in addition to the configuration of the first or second aspects of the invention, the shroud is formed on both horizontal sides with bulging portions which bulge rearward, and the attachment portions are provided at horizontal side lower portions of the shroud to overlap the respective bulging portions as viewed from above.

According to the first aspect of the invention, since the radiator is covered from behind by the shroud, running-air that passes the radiator does not strike the rider. In addition, the attachment arm portions provided at the upper portion of the radiator are attached to the body frame and the attachment portions fastened to the respective stays provided on the body frame are provided at the rear lower portion of the shroud attached to the radiator. Thus, while avoiding an increase in the number of component parts by eliminating a special component part such as an existing stay or the like for supporting the lower portion of the radiator, the radiator can reliably be supported by the body frame with heat transmitted from the engine suppressed to a low level.

According to the second aspect of the invention, since the radiator fan is attached to the shroud, the cooling component part requires only one component part, to avoid an increase in the number of component parts. In addition, since the support leg portion provided at the lower portion of the shroud is brought into abutment against the rear portion of the radiator, also the rigidity of the shroud can be ensured.

According to the third aspect of the invention, the bulging portions formed on both horizontal sides of the shroud to bulge rearward increase the area of the running-air passage between the radiator and the shroud to increase the amount of running-air. Thus, the cooling performance of the radiator can be increased and the rigidity of the shroud can be increased. In addition, the bulging portions are formed to overlap the respective attachment portions provided on the rear lower portion of the shroud, as viewed from above, so that they can be further enlarged. Since the attachment portions are provided on both the sides of the lower portion of the shroud, the support rigidity of the radiator can be increased.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment of the present invention will hereinafter be described with reference to the accompanying drawings.

Figure 1:
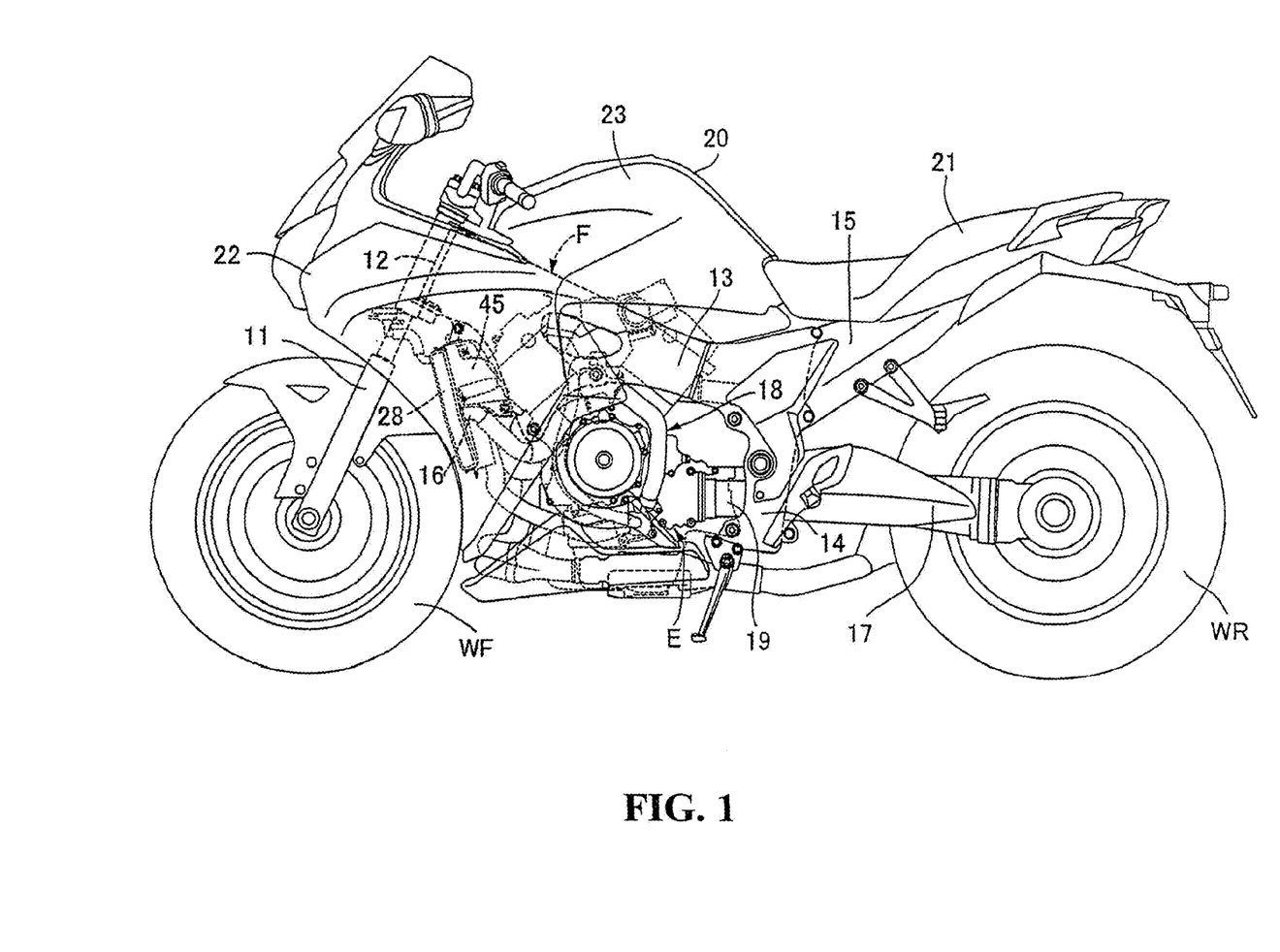
FIG. 1 is a lateral view of a motorcycle.

Referring first to FIG. 1, a body frame F of a motorcycle includes a head pipe 12 steerably supporting a front fork 11 rotatably supporting a front wheel WF; and a pair of left and right main frames 13 extending rearward and downward from the head pipe 12. The body frame F further includes a pair of right and left center frames 14 provided continuously with the rear portions of the respective main frames 13 so as to extend downward; and a pair of left and right rear frames 15 extending rearward and upwardly from the respective center frames 14. The main frames 13 are provided integrally with respective engine hangers 16 extending downward from their corresponding central portions. A swing arm 17 is swingably supported at a front end by the center frames 14. A rear wheel WR is rotatably supported by the rear portion of the swing arm 17.

An engine body 18 of a water-cooled engine E is disposed below the main frames 13. The engine body 18 is mounted to the lower portions of the engine hangers 16, the main frames 13 and the center frames 14 so as to be suspended therefrom. Rotational power outputted form the engine E is transmitted to the rear wheel WR via a drive shaft 19. This drive shaft 19 extends back and forth and passes through the inside of the swing arm 17.

A fuel tank 20 is mounted on the main frames 13. A riding seat 21 is provided rearward of the fuel tank 20 and on the rear frames 15.

The body frame F and the engine E are partially covered by a body cover 22. This body cover 22 includes a tank cover 23 laterally covering the major portion of the fuel tank 20.

Figure 2:
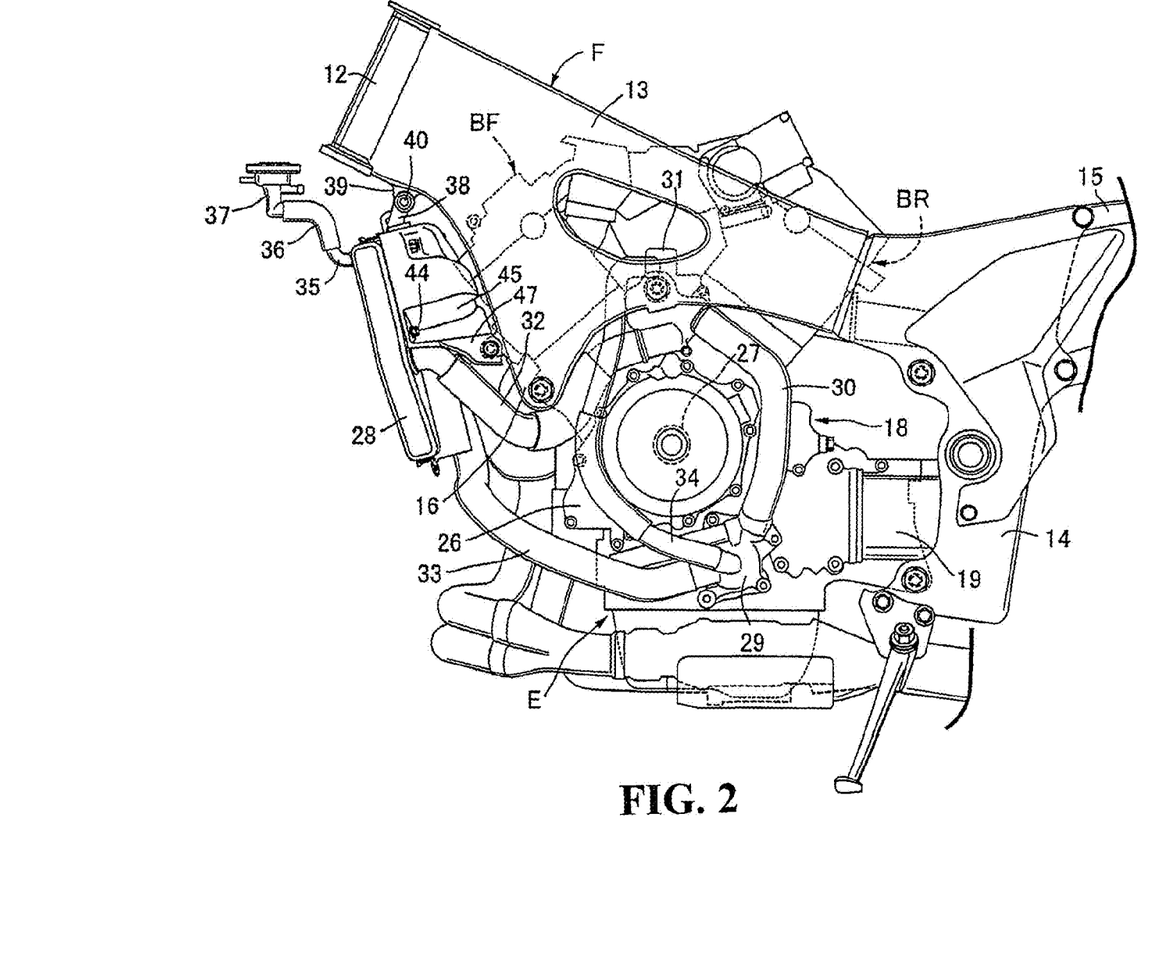
FIG. 2 is an enlarged lateral view illustrating the vicinity of an engine and a radiator.

With additional reference to FIG. 2, the engine body 18 has a front bank BF and a rear bank BR, forming a V-shape. The front bank BF is located anteriorly in the state where the engine body 18 is mounted on the motorcycle. The rear bank BR is located rearward of the front bank BF. A crankshaft 27 is rotatably journaled by a crankcase 26 shared by both the banks BF, BR so as to extend in the left-right direction of the motorcycle.

A radiator 28 is disposed forward of the engine body 18. A water pump 29 drivingly rotated by the crankshaft 27 is mounted to a lower left lateral surface of the crankcase 26. A water supply hose 30 continuous with the discharge port of the water pump 29 is coupled to a water jacket water-supply portion provided in a valley between the front and rear banks BF, BR. Cooling water is supplied from the water jacket water-supply portion to the water jackets of both the banks BF, BR. A thermostat 31 is disposed in the valley between the front and rear banks BF, BR. During warm-up of the engine E, cooling water that has passed the water jackets is supplied from the thermostat 31 via a return hose 32 to the radiator 28. The water cooled by the radiator 28 is returned via a hose 33 to the water pump 29. In the state where the engine E is not warmed up, cooling water is partially returned from the thermostat 31 via a bypass hose 34 to the water pump 29.

A water supply pipe 35 is provided at an upper portion of the radiator 28. A water supply hose 36 is continuous with the water supply pipe 35 and extends upward. A filler pipe 37 is connected to the upper end of the water supply hose 36.

With additional reference to FIGS. 3 to 7, the radiator 28 is provided at an upper portion with a pair of left and right attachment arm portions 38 which extend upward. The left and right attachment arm portions 38 are attached at upper ends to a pair of left and right radiator support portions 39, respectively. The radiator support portions 39 are provided integrally with front lower portions of the main frames 13 of the body frame F.

Figure 5:
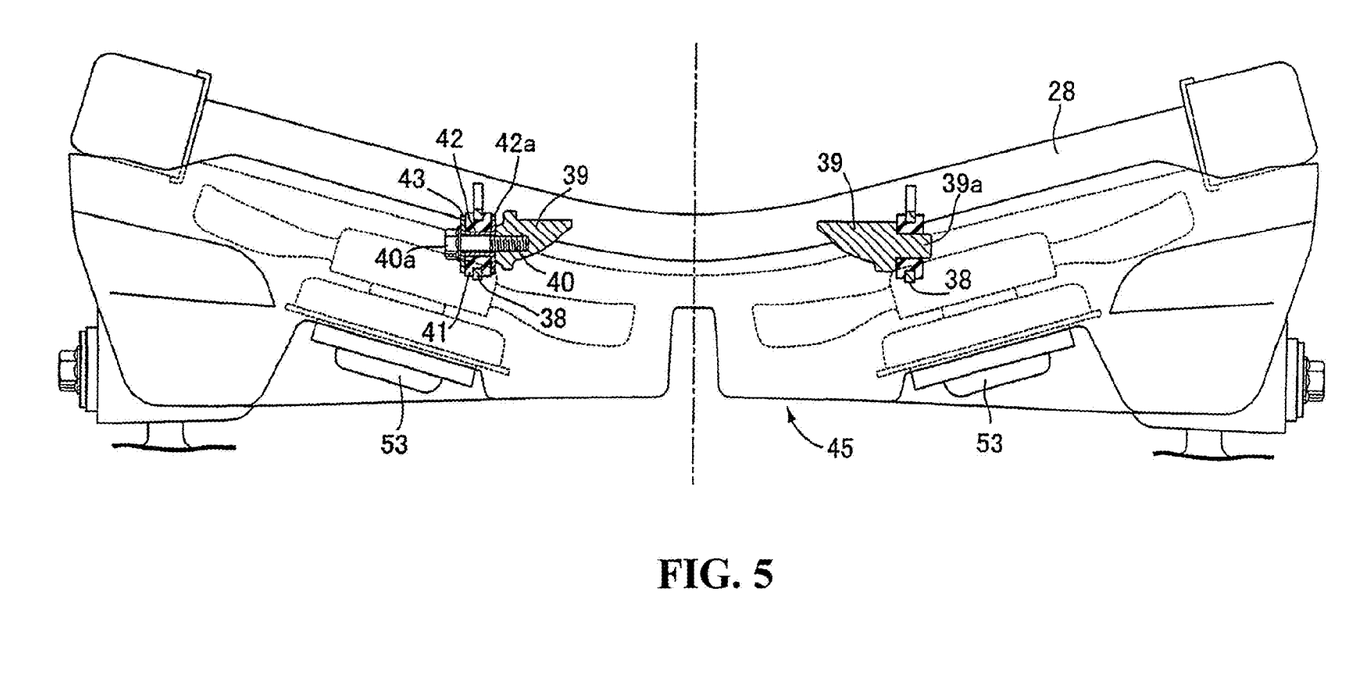
FIG. 5 is a cross-sectional view taken along line 5-5 of FIG. 3.
Figure 6:
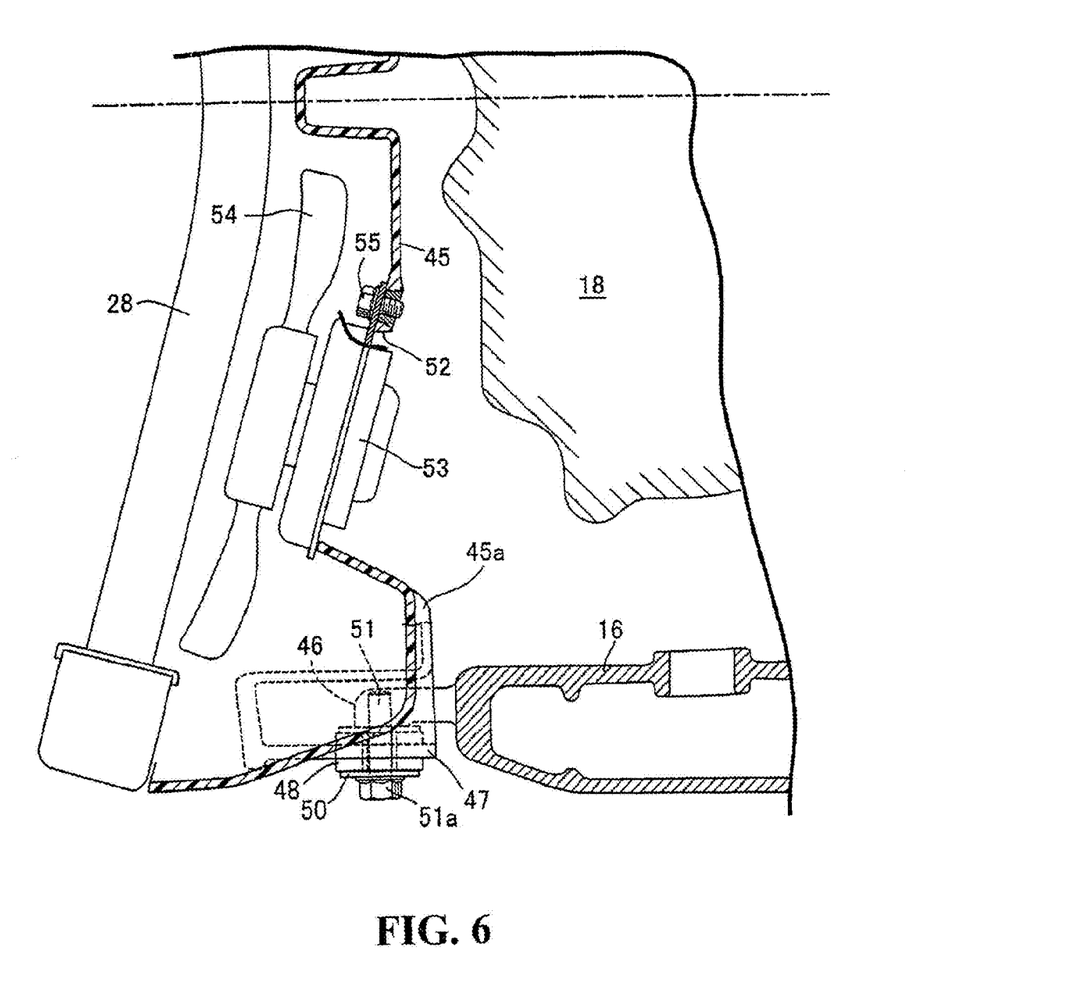
FIG. 6 is a cross-sectional view taken along line 6-6 of FIG. 3.

Paying attention to FIG. 5, a rubber 41 is attached to an upper end of the left attachment arm 38 of the attachment arms 38. A sleeve 42 is inserted through the inside of the rubber 41. A flange 42a is provided integrally with one end of the sleeve 42 so as to be sandwiched between the rubber 41 and the left radiator support portion 39. A bolt 40 is inserted through a washer 43 and the sleeve 42 and threadedly engaged with the left radiator support portion 39. The bolt 40 has an enlarged-diameter head portion 40a which is abutted against and engaged with the washer 43, in which the rubber 41 is sandwiched between the washer 43 and the flange 42a. On the other hand, a rubber 41 is attached also to an upper end of the right attachment arm portion 38. A stem portion 39a is fitted to the rubber 41. The stem portion 39a is provided to project from the right radiator support portion 39. In short, both the attachment arm portions 38 are attached to the both the radiator support portions 39 via the rubbers 41.

Figure 3:
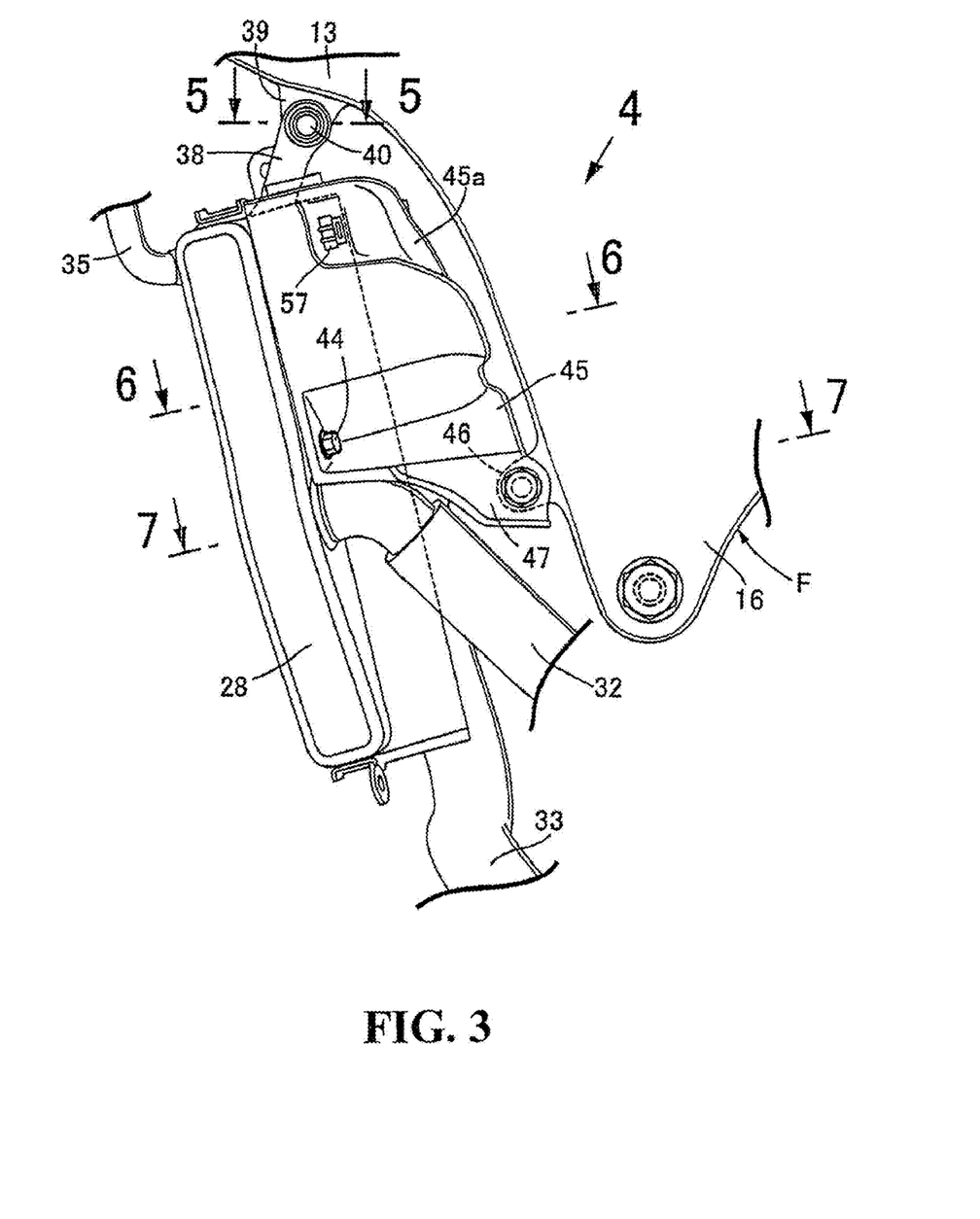
FIG. 3 is a lateral view of the radiator and a shroud.
Figure 4:
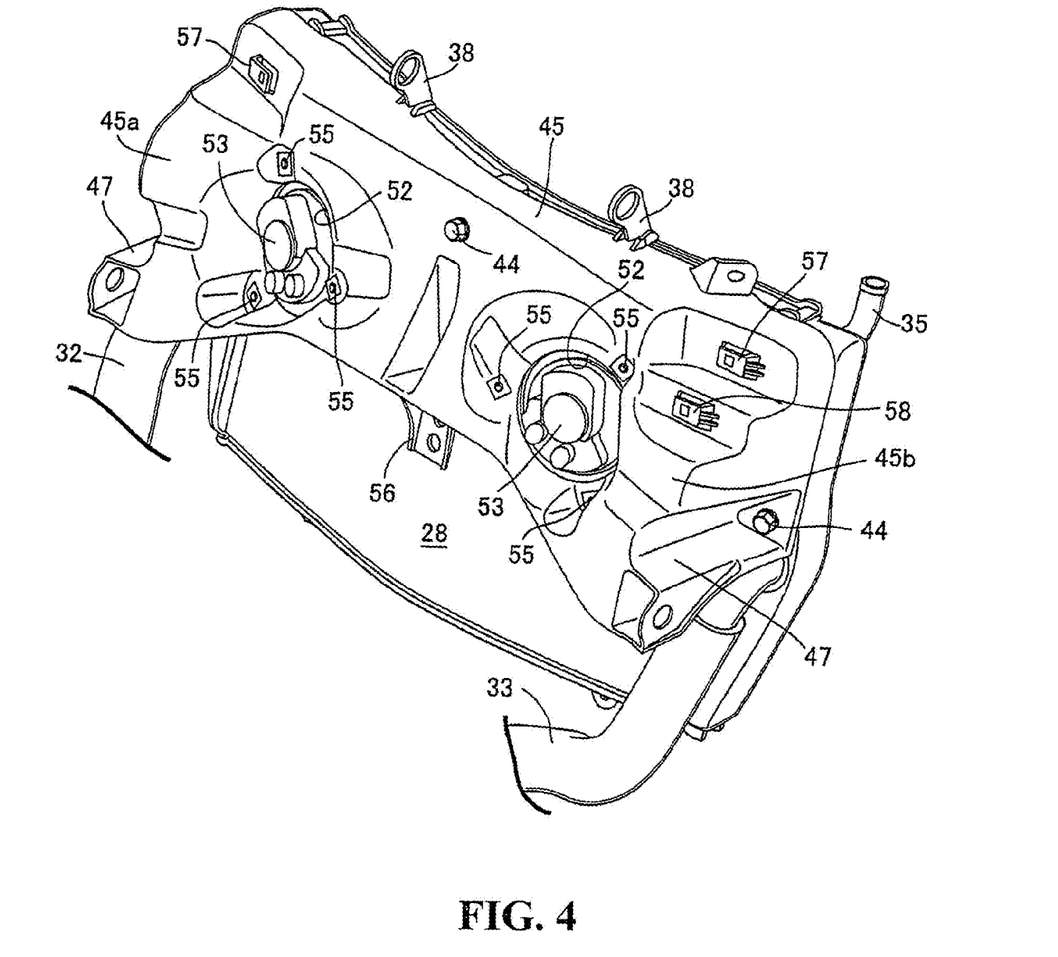
FIG. 4 is a view as viewed from arrow 4 of FIG. 3.

A shroud 45 is disposed rearward of the radiator 28 to shield the radiator 28 from behind. In this embodiment, the shroud 45 is formed of a synthetic resin so as to cover an upper half portion of the radiator 28 from behind. In addition, the shroud 45 is fastened to the rear surface of the radiator 28 by means of screw members 44 located at a plurality of, e.g. three, positions. Further, the shroud 45 is attached on both sides of a rear lower portion to stays 46 which are provided to project from the respective engine hangers 16 of the body frame F.

Attachment portions 47 are provided on both sides of rear lower portions of the shroud 45 so as to be fastened to the respective stays 46. The attachment portions 47 are each formed to open rearward in such a manner as to receive a corresponding one of the stays 46 inserted thereinto. In addition, the attachment portions 47 are each formed in a bottomed rectangular cylinder having a closed front end.

Figure 7:
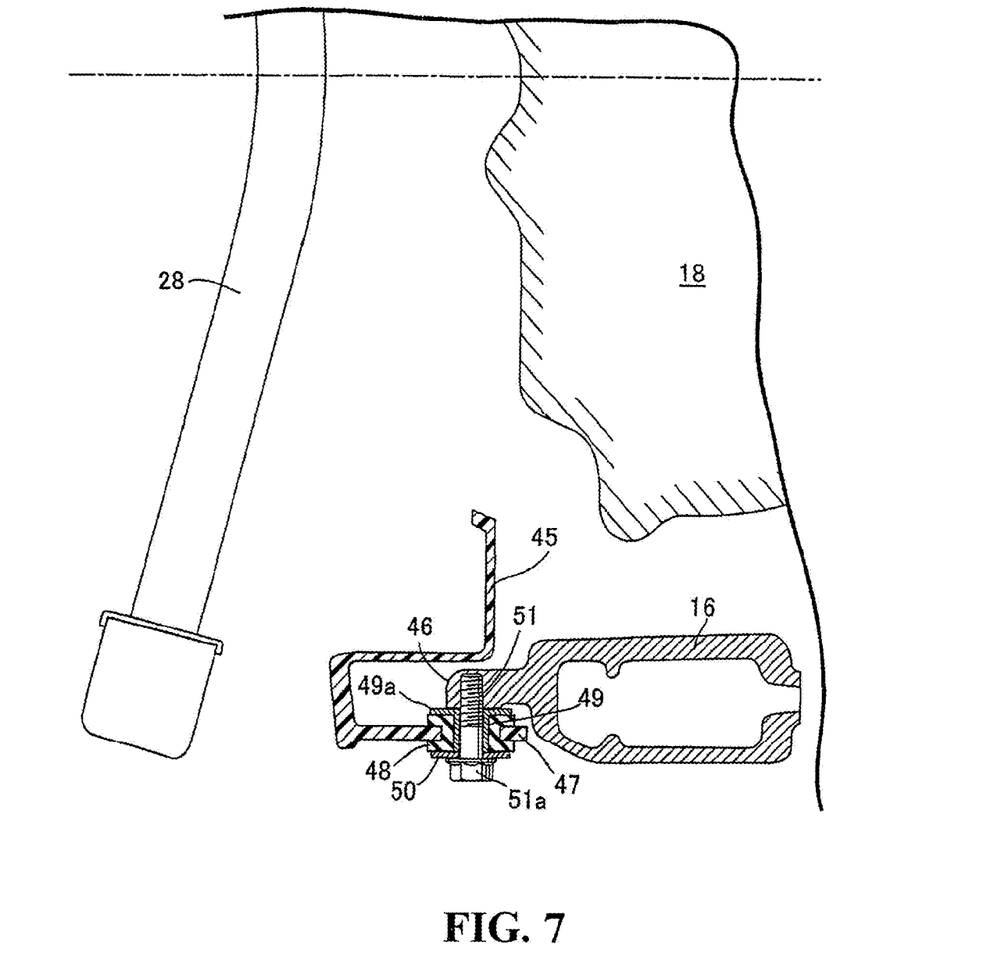
FIG. 7 is a cross-sectional view taken along line 7-7 of FIG. 3.

As clearly illustrated in FIG. 7, a rubber 48 is attached to an external lateral wall of the attachment portion 47. A sleeve 49 is inserted through the inside of the rubber 48. A flange 49a is provided integrally with one end of the sleeve 49 so as to be sandwiched between the stay 46 and the rubber 48. A bolt 51 is inserted through the washer 50 and the sleeve 49 and threadedly engaged with the stay 46. An enlarged-diameter head portion 51a of the bolt 51 is abutted against and engaged with a washer 50, in which the rubber 48 is sandwiched between the washer 50 and the flange 49a. In short, the attachment portions 47 are attached to the stays 46 via the rubbers 48.

The shroud 45 is provided with a pair of left and right opening portions 52. Radiator fans 53 are disposed in the respective opening portions 52. The radiator fans 53 are attached to the shroud 45 in such a manner that blades 54 are disposed between the shroud 45 and the radiator 28. The radiator fans 53 are each fastened to the shroud 45 by means of a plurality of, e.g. three, screw members 55 arranged on the circumference of each opening portion 52.

A support leg portion 56 is provided at a horizontally central lower portion of the shroud 45 so as to extend forward and come into abutment against the rear surface of the radiator 28. Further, bulging portions 45a, 45b are formed on both left and right sides of the shroud 45 to bulge toward the rearward. The attachment portions 47 are provided at lower portions, on both left and right sides, of the shroud 45 so as to overlap the respective bulging portions 45a, 45b as viewed from above.

In addition, both the bulging portions 45a, 45b are provided on their upper rear surfaces with respective motor couplers 57 which correspond to the respective radiator fans 53. An electrical component coupler 58 is provided on the right bulging portion 45b at a position below the motor coupler 57.

A description is next given of an operation of the embodiment. Since the shroud 45 is attached to the radiator 28 so as to cover it from behind, it is possible to allow running-air passing the radiator 28 not to strike the rider. The attachment arm portions 38 provided at the upper portion of the radiator 28 are attached to the radiator support portions 39 provided on the main frames 13 of the body frame F. The attachment portions 47 provided on both the sides of the rear lower portion of the shroud 45 are fastened to the stays 46 provided in the engine hangers 16 of the body frame F. Thus, while eliminating a special component part such as an existing stay or the like for supporting the lower portion of the radiator 28 to avoid an increase in the number of component parts, the radiator 28 can be supported by the body frame F with heat from the engine E suppressed to a low level. In addition, since the attachment portions 47 are provided on both the left and right sides of the shroud 45, the support rigidity of the radiator 28 is increased so that the radiator 28 can reliably be supported by the body frame F.

Since the radiator fans 53 are attached to the shroud 45 made of a synthetic resin, the cooling component part requires only one component part to avoid an increase in the number of component parts. In addition, since the support leg portion 56 provided at the lower portion of the shroud 45 is brought into abutment against the rear portion of the radiator 28, also the rigidity of the shroud 45 can be ensured.

Further, the bulging portions 45a, 45b bulging toward the rearward are formed on both the left and right sides of the shroud 45. Therefore, the bulging portions 45a, 45b on both the left and right sides of the shroud can increase the area of the running-air passage between the radiator 28 and the shroud 45 to increase the amount of running air, which can enhance the cooling performance of the radiator. In addition, the rigidity of the shroud 45 can be increased.

Additionally, the bulging portions 45a, 45b are formed to overlap the respective attachment portions 47, as viewed from above, provided on both the sides of the rear lower portions of the shroud 45. Therefore, the bulging portions 45a, 45b are further enlarged to further increase the amount of running-air to further enhance the cooling performance of the radiator 28.

Although the embodiment of the present invention has been described thus far, the present invention is not limited to the embodiment. Various modifications or alternations in design may be made without departing from the scope of the invention as claimed.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A radiator mounting structure for a motorcycle in which a radiator is disposed forward of a water-cooled engine mounted on a body frame and in which an upper portion of said radiator is attached to said body frame, said radiator mounting structure comprising:
    a shroud covering said radiator from behind and attached to said radiator;
    an attachment arm portion disposed at an upper portion of said shroud; and
    at least one attachment portion disposed at a rear lower portion of said shroud,
    wherein said attachment arm portion is attachable to said body frame, and
    wherein said attachment portion is attachable to a stay provided on said body frame.

2. The radiator mounting structure for a motorcycle according to claim 1, further comprising:
    a radiator fan attached to said shroud; and
    a supporting leg portion provided at a lower portion of said shroud,
    wherein said supporting leg portion is abutable against a rear portion of said radiator.

3. The radiator mounting structure for a motorcycle according to claim 1,
    wherein two attachment portions are provided, each of said two attachment portions being disposed on said rear lower portion of said shroud at opposite horizontal sides,
    wherein said shroud further comprises two bulging portions bulging rearward, each of said two bulging portions being disposed at said opposite horizontal sides of said shroud, and
    wherein each of said two attachment portions overlaps a corresponding one of said two bulging portions when viewed from above.

4. The radiator mounting structure for a motorcycle according to claim 2,
    wherein two attachment portions are provided, each of said two attachment portions being disposed on said rear lower portion of said shroud at opposite horizontal sides,
    wherein said shroud further comprises two bulging portions bulging rearward, each of said two bulging portions being disposed at said opposite horizontal sides of said shroud, and
    wherein each of said two attachment portions overlaps a corresponding one of said two bulging portions when viewed from above.

5. The radiator mounting structure for a motorcycle according to claim 1,
    wherein said attachment arm portion is attachable to said body frame via a first rubber portion, and
    wherein said attachment portion is attachable to said stay provided on said body frame via a second rubber portion.

6. The radiator mounting structure for a motorcycle according to claim 1,
    wherein said attachment portion is formed in a bottomed rectangular cylinder having a closed front end.

7. The radiator mounting structure for a motorcycle according to claim 2,
    wherein said supporting leg portion is provided at a horizontally central location of said lower portion of said shroud.

8. The radiator mounting structure for a motorcycle according to claim 2,
    wherein said attachment arm portion is attachable to said body frame via a first rubber portion, and
    wherein said attachment portion is attachable to said stay provided on said body frame via a second rubber portion.

9. The radiator mounting structure for a motorcycle according to claim 2,
    wherein said attachment portion is formed in a bottomed rectangular cylinder having a closed front end.

10. The radiator mounting structure for a motorcycle according to claim 3,
    wherein said attachment arm portion is attachable to said body frame via a first rubber portion, and
    wherein said attachment portion is attachable to said stay provided on said body frame via a second rubber portion.

11. The radiator mounting structure for a motorcycle according to claim 3,
    wherein said attachment portion is formed in a bottomed rectangular cylinder having a closed front end.

12. The radiator mounting structure for a motorcycle according to claim 4,
    wherein said supporting leg portion is provided at a horizontally central location of said lower portion of said shroud.

13. The radiator mounting structure for a motorcycle according to claim 4,
    wherein said attachment arm portion is attachable to said body frame via a first rubber portion, and
    wherein said attachment portion is attachable to said stay provided on said body frame via a second rubber portion.

14. The radiator mounting structure for a motorcycle according to claim 4,
    wherein said attachment portion is formed in a bottomed rectangular cylinder having a closed front end.

* * * * *